(12) United States Patent
Samudrala et al.

(10) Patent No.: US 9,544,081 B2
(45) Date of Patent: Jan. 10, 2017

(54) SLOT SEGREGATION FOR SUPPORTING MULTIPLE COMMUNICATION PROTOCOLS IN AN INDUSTRIAL WIRELESS NETWORK

(71) Applicants: Prasad Samudrala, Bangalore (IN); Alexander Chernoguzov, Warrington, PA (US); Soumitri N. Kolavennu, Blaine, MN (US); Channabasavaraj Raravi, Hospet (IN)

(72) Inventors: Prasad Samudrala, Bangalore (IN); Alexander Chernoguzov, Warrington, PA (US); Soumitri N. Kolavennu, Blaine, MN (US); Channabasavaraj Raravi, Hospet (IN)

(73) Assignee: Honeywell International Inc., Morris Plains, NJ (US)

(*) Notice: Subject to any disclaimer, the term of this patent is extended or adjusted under 35 U.S.C. 154(b) by 480 days.

(21) Appl. No.: 13/871,897

(22) Filed: Apr. 26, 2013

(65) Prior Publication Data

US 2014/0321443 A1 Oct. 30, 2014

(51) Int. Cl.
*H04J 3/16* (2006.01)
*H04W 72/04* (2009.01)
*H04W 72/12* (2009.01)

(52) U.S. Cl.
CPC ........ *H04J 3/1694* (2013.01); *H04W 72/0446* (2013.01); *H04W 72/12* (2013.01)

(58) Field of Classification Search
CPC .............. H04J 3/1694; H04W 72/0446; H04L 29/06163; H04L 45/52; H04L 49/60; H04L 49/602; H04L 69/18; H04L 29/06068

See application file for complete search history.

(56) References Cited

U.S. PATENT DOCUMENTS

| | | | |
|---|---|---|---|
| 5,732,076 A * | 3/1998 | Ketseoglou et al. | 370/347 |
| 6,711,177 B1 * | 3/2004 | Young | 370/468 |
| 7,327,717 B2 | 2/2008 | Borowski et al. | |
| 7,965,664 B2 | 6/2011 | Hodson et al. | |
| 7,969,300 B2 | 6/2011 | Coronel et al. | |
| 8,583,067 B2 | 11/2013 | Budampatl et al. | |
| 2001/0030975 A1 * | 10/2001 | Limb et al. | 370/465 |
| 2002/0105970 A1 * | 8/2002 | Shvodian | 370/468 |
| 2003/0169711 A1 | 9/2003 | Borowski et al. | |
| 2005/0005304 A1 * | 1/2005 | Kaul et al. | 725/118 |

(Continued)

OTHER PUBLICATIONS

Nokia, 9100 Multi-Standard Base Station, retrieved on Aug. 29, 2016, https://networks.nokia.com/products/9100-multi-standard-base-station, 1 page.*

(Continued)

*Primary Examiner* — Hoon J Chung

(57) ABSTRACT

A method includes dividing a Time Division Multiple Access (TDMA) structure into a plurality of first time slots and a plurality of second time slots. The first and second time slots are allocated to communications using first and second protocols, respectively. The method also includes communicating with at least one first wireless device using the first protocol during the first time slots. The method further includes communicating with at least one second wireless device using the second protocol during the second time slots.

22 Claims, 4 Drawing Sheets

(56) References Cited

U.S. PATENT DOCUMENTS

| | | |
|---|---|---|
| 2005/0174964 A1 | 8/2005 | Orlik et al. |
| 2006/0087423 A1 | 4/2006 | Coronel et al. |
| 2007/0280144 A1 | 12/2007 | Hodson et al. |
| 2008/0198774 A1 | 8/2008 | Li |
| 2009/0316628 A1 | 12/2009 | Enns et al. |
| 2010/0075611 A1 | 3/2010 | Budampati et al. |
| 2012/0230446 A1* | 9/2012 | Feng .............................. 375/272 |
| 2012/0236768 A1 | 9/2012 | Kolavennu et al. |

OTHER PUBLICATIONS

International Search Report dated Oct. 10, 2014 in connection with International Application No. PCT/US2014/038208; 3 pages.
Written Opinion of international Searching Authority dated Oct. 10, 2014 in correction with International Application No. PCT/US2014/038208; 5 pages.
Communication pursuant to Article 94(3) EPC dated Oct. 10, 2014 in connection with European Patent Application No. 14164273.6: 5 pages.
Definition of "ISA100.11a"; Wikipedia; http://en.wikipedia.org/w/index.php?title =ISA100.11a&oldid=51785523; Oct. 11, 2011; 2 pages.
Definition of "WirelessHART"; Wikipedia; http://en.wikipedia.org/w/index.php?title=WirelessHART&oldid=537680893; Feb. 11, 2013; 2 pages.
Definition of "Time Division Multiple Access"; Wikipedia; http://en.wikipedia.org/w/index.php?title=Time_division_Muitiple_access&oldid.554280718; May 9, 2013; 2 pages.
European Examination Report dated Oct. 11, 2016 in connection with European Application No. 14164273.6, 5 pages.

\* cited by examiner

US 9,544,081 B2

SLOT SEGREGATION FOR SUPPORTING MULTIPLE COMMUNICATION PROTOCOLS IN AN INDUSTRIAL WIRELESS NETWORK

TECHNICAL FIELD

This disclosure relates generally to wireless communication systems. More specifically, this disclosure relates to slot segregation for supporting multiple communication protocols in an industrial wireless network.

BACKGROUND

Wireless networks are frequently used in industrial process control systems. For example, a process control system often includes sensors that provide measurements over a wireless network and actuators that receive control signals over the wireless network. The wireless network may include interconnected network devices such as multinodes acting as backbone routers, field device access points (FDAPs) acting as field routers, field instruments, and wireless device managers (WDMs) acting as gateway/security managers or network managers.

A wireless network in an industrial facility often supports network devices compatible with only one specific communication standard. Generally, a wireless network requires extensive hardware modifications in order to enable the network to support network devices compatible with multiple standards. Thus, additions or replacements of network devices in a particular industrial facility are typically allowed only if the new network devices are compatible with the communication standard used in the industrial facility.

SUMMARY

This disclosure provides slot segregation for supporting multiple communication protocols in an industrial wireless network.

In a first embodiment, a method includes dividing a Time Division Multiple Access (TDMA) structure into a plurality of first time slots and a plurality of second time slots. The first and second time slots are allocated to communications using first and second protocols, respectively. The method also includes communicating with at least one first wireless device using the first protocol during the first time slots. The method further includes communicating with at least one second wireless device using the second protocol during the second time slots.

In a second embodiment, an apparatus includes a transceiver configured to communicate with wireless devices in different time slots of a TDMA structure. The TDMA structure includes a plurality of first time slots and a plurality of second time slots. The transceiver is configured to communicate with at least one first wireless device using a first protocol during the first time slots. The transceiver is configured to communicate with at least one second wireless device using a second protocol during the second time slots.

In a third embodiment, a non-transitory computer readable medium embodies a computer program. The computer program includes computer readable program code for dividing a TDMA structure into a plurality of first time slots and a plurality of second time slots. The first and second time slots are allocated to communications using first and second protocols, respectively. The computer program also includes computer readable program code for initiating communication with at least one first wireless device using the first protocol during the first time slots. The computer program further includes computer readable program code for initiating communication with at least one second wireless device using the second protocol during the second time slots.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

This disclosure generally provides methods and systems for slot segregation to support multiple wireless communication protocols or standards. The methods and systems may be implemented in, for example, a wireless network capable of supporting multiple devices operating in accordance with different protocols or standards. In the following description, the methods and systems are described as enabling a wireless network in an industrial facility to simultaneously support field instruments operating under ISA100 standards and field instruments operating under wireless Highway Addressable Remote Transducer (WHART) standards. These two standards are provided for illustration only, and other or additional standards could be supported in an industrial wireless network. In general, field instruments may include transmitters, receivers, sensors, actuators, and WiFi, Ethernet, and Internet Protocol (IP) based devices.

Figure 1:
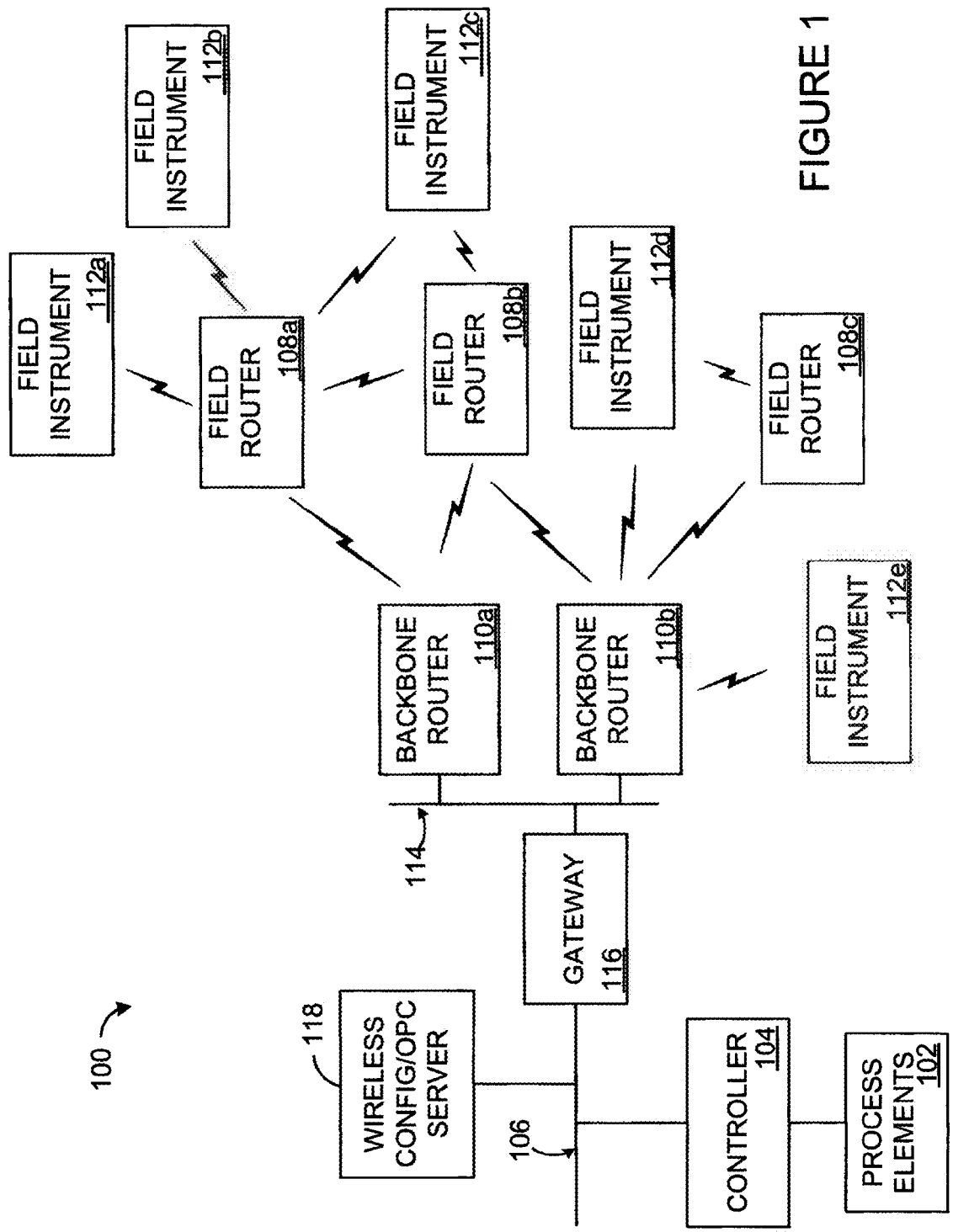
FIG. 1 illustrates an example industrial control and automation system having slot segregation for supporting multiple communication protocols according to this disclosure.

FIG. 1 illustrates an example industrial control and automation system 100 having slot segregation for supporting multiple communication protocols according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing a MICROSOFT WINDOWS or suitable real-time operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks for communicating with wireless sensors or other wireless field devices. In the example shown in FIG. 1, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100.11a and WHART.

In this example, the field routers 108a-108c and backbone routers 110a-110b generally represent routing devices that store and forward messages for other devices and that are typically line-powered, meaning these devices receive operating power from external sources (such as AC supply lines). However, a field or backbone router could represent a device powered by a local power supply, such as an internal battery (referred to as locally-powered). The field instruments 112a-112e generally represent non-routing devices that are routinely locally-powered, although a field instrument could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. In particular embodiments, the field routers 108a-108c could represent field device access points (FDAPs), and the backbone routers 110a-110b could represent multinodes. The backbone network 114 includes any suitable network for transporting data, such as a FAULT TOLERANT ETHERNET network, a wireless mesh network, or other wired or wireless network.

A gateway 116 couples the network 106 and the backbone network 114. The gateway 116 can perform security functions to allow only authorized traffic to flow between the networks 106 and 114. The gateway 116 can also perform translation functions to translate between protocols. The gateway 116 includes any suitable structure for providing access to networks and translating between protocols used by those networks.

A wireless configuration and OLE for Process Control (OPC) server 118 can configure and control various aspects of the system 100. For example, the server 118 could configure the operation of the field routers 108a-108c, backbone routers 110a-110b, and field instruments 112a-112e. The server 118 could also support security in the system 100, such as by distributing cryptographic keys or other security data to various wireless devices or other components. The server 118 includes any suitable structure for configuring wireless networks and providing security information.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multi-functional, plant-wide coverage for wireless sensing, asset location tracking, personnel tracking, wireless communications, and any other or additional functionality as desired.

In one aspect of operation, one or more components forming the wireless network in the system 100 support the use of multiple communication protocols, such as protocols compliant with the ISA100 and WHART standards. To support this functionality, communications in the wireless network can be divided into time slots using Time Division Multiple Access (TDMA). In some embodiments, communications in the wireless network occur during superframes, each superframe is divided into multiple frames, and each frame is divided into multiple time slots. In particular embodiments, communications during the time slots of a single frame can occur using one protocol, and communications during the time slots of different frames can occur using different protocols. The time slots are allocated to different devices, thus allowing a single wireless channel to transport data forming part of multiple data transmissions.

As described in more detail below, a physical layer of a device (such as a field router 108a-108c or backbone router 110a-110b) supports TDMA data transmissions using multiple protocols. The physical layer of a transmitting device is responsible for the actual transmission of data across a transmission medium, and the physical layer of a receiving device is responsible for the actual reception of data over the transmission medium. The physical layer in a field instrument 112a-112e could support a single wireless protocol during the time slots assigned to that field instrument, while the physical layer in a field router 108a-108c or backbone router 110a-110b could support different wireless protocols during different time slots. However, a field instrument could communicate using different protocols, and a field router or backbone router could communicate using a single protocol. There is no requirement that every field instrument communicate using a single protocol and that every field or backbone router communicate using different protocols. Additional details regarding the use of multiple protocols in a TDMA wireless network are provided below.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where the use of multiple protocols can be supported. This functionality could be used in any other suitable system.

Figure 2:
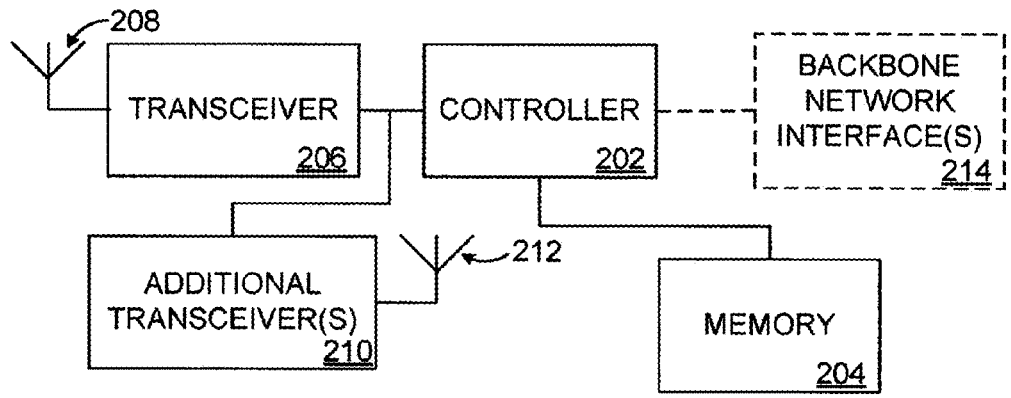
FIG. 2 illustrates an example wireless router in an industrial control and automation system according to this disclosure.

FIG. 2 illustrates an example wireless router 200 in an industrial control and automation system according to this disclosure. The wireless router 200 could, for example, represent a field router 108a-108c or a backbone router 110a-110b in the system 100 of FIG. 1.

As shown in FIG. 2, the router 200 includes a controller 202, which controls the overall operation of the router 200. For example, the controller 202 may receive or generate data to be transmitted, and the controller 202 could provide the data to other component(s) in the router 200 for transmission over a wired or wireless network. The controller 202 could also receive data over a wired or wireless network and use or forward the data. As a particular example, the controller 202 in a field router or backbone router could receive data transmitted wirelessly, determine a next hop for the data (if any), and provide the data for transmission to the next hop (if any). As another example, the controller 202 in a backbone router could receive data from a wired network and provide the data for transmission in a wireless network (or vice versa). The controller 202 includes any suitable structure for controlling operation of a wireless router. As particular examples, the controller 202 could represent a processor, microprocessor, microcontroller, field programmable gate array, digital signal processor, or other processing or control device.

A memory 204 is coupled to the controller 202. The memory 204 stores any of a wide variety of information used, collected, or generated by the router 200. For example, the memory 204 could store information received over a network that is to be transmitted over the same or other network. The memory 204 includes any suitable volatile and/or non-volatile storage and retrieval device(s).

The router 200 also includes one or more wireless transceivers 206 coupled to one or more antennas 208. In a field or backbone router, the transceiver(s) 206 and antenna(s) 208 can be used to communicate wirelessly with one or more field instruments. One or more additional transceivers 210 can be used to communicate with other field or backbone routers. The additional transceiver(s) 210 may be coupled to one or more antennas 212 or share one or more common antennas (such as antenna(s) 208). Each transceiver includes any suitable structure for providing signals for wireless transmission and/or for obtaining signals received wirelessly. Each antenna represents any suitable structure for transmitting and/or receiving wireless signals. In some embodiments, each transceiver represents an RF transceiver, such as an RF FHSS or DSSS transceiver. Also, each antenna could represent an RF antenna. Note that any other suitable wireless signals could be used to communicate and that each transceiver could include a transmitter and a separate receiver.

If the router 200 represents a backbone router, the router 200 further includes one or more backbone network interfaces 214. The backbone network interfaces 214 allow the router 200 to communicate over one or more backbone networks 114. Each backbone network interface 214 includes any suitable structure for transmitting and/or receiving signals over a backbone network, such as an Ethernet interface or a wireless transceiver.

As described in more detail below, one or more of the transceivers 206, 210 in the router 200 support the use of multiple protocols, such as the ISA100 and WHART protocols, using TDMA time slots. This enables field instruments and routers to be more easily added to or replaced in the system 100. This can be accomplished by providing a physical layer in one or more of the transceivers 206, 210 that support the use of multiple protocols in TDMA time slots. In particular embodiments, the physical layer is compliant with the IEEE 802.15.4 standard.

Although FIG. 2 illustrates one example of a wireless router 200 in an industrial control and automation system, various changes may be made to FIG. 2. For example, various components in FIG. 2 could be combined, subdivided, or omitted and additional components could be added according to particular needs. As a particular example, the router 200 could communicate with other routers using the same transceiver(s) 206 and antenna(s) 208 used to communicate with field instruments. Also, a "wireless device" or "wireless router" represents any device or router that can transmit and/or receive data wirelessly, even if the device or router has the ability to transmit and/or receive data over a wired connection as well.

Figure 3:
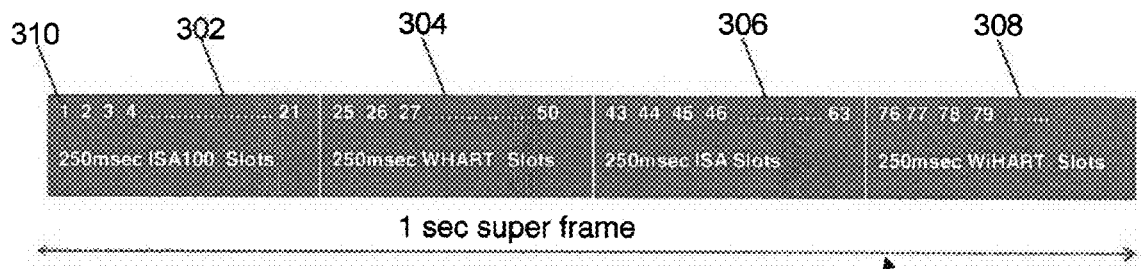
FIG. 3 illustrates an example time division multiple access (TDMA) structure supporting multiple communication protocols according to this disclosure.

FIG. 3 illustrates an example TDMA structure supporting multiple communication protocols according to this disclosure. As shown in FIG. 3, the physical layer of a device can divide a repeating TDMA superframe 300 into four frames 302-308, where each frame 302-308 is divided into multiple time slots 310. In this particular example, the superframe 300 has a length of one second, and each frame 302-308 has a length of 250 ms. Note, however, that other lengths of time could be used for the superframe 300 or the frames 302-308.

Different protocols are used during different frames 302-308. In this example, the different protocols are interleaved, with ISA100 being used in frames 302 and 306 and WHART being used in frames 304 and 308. However, the use of these two protocols in an interleaved manner is for illustration only. A device could support the use of other or additional protocols, more than two protocols, and any arrangement of the protocols within a superframe 300. For example, the use of the protocols need not be divided equally amongst the frames. As a particular example, if 75% of the devices communicating with a router are ISA100 devices and 25% are WHART devices, ISA100 could be used during three of every four frames, while WHART could be used during one of every four frames. The allocation of protocols to frames could occur in any suitable manner, such as based on user inputs during system installation or at other times or dynamically.

The time slots 310 in the different frames 302-308 could have any suitable length(s). For example, the time slots 310 in the ISA100 frames 302 and 306 could each have a length of 11.7 ms, and the time slots 310 in the WHART frames 304 and 308 could each have a length of 10 ms. Other lengths for the time slots 310 could also be used, and the time slots need not have equal lengths across different frames or even within the same frame (such as when the last time slot in a frame is extended to encompass any remaining time in the frame).

By dividing time into multiple time slots that are allocated between ISA100 and WHART devices, the physical layer supports different devices operating according to different protocols. The TDMA structure shown here could be supported by the physical layer of any suitable device, such as in the transceiver 206, 210 of the router 200. Moreover, this functionality can be obtained in existing routers that have already been installed, such as by performing a firmware upgrade on routers that support one protocol to allow those routers to communicate using a second protocol in different time slots.

Although FIG. 3 illustrates one example of a TDMA structure supporting multiple communication protocols, various changes may be made to FIG. 3. For example, as noted above, more than two protocols can be used in any suitable order.

Figure 4:
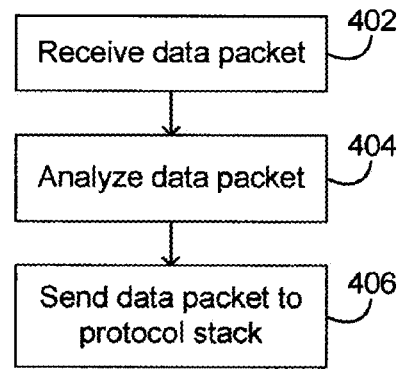
FIG. 4 illustrates an example method for slot segregation for supporting multiple communication protocols according to this disclosure.

FIG. 4 illustrates an example method 400 for slot segregation for supporting multiple communication protocols according to this disclosure. The method 400 could, for example, be performed by the physical layer of the transceiver 206, 210 in the router 200.

As shown in FIG. 4, a data packet is received at step 402. This could include, for example, the router 200 receiving a data packet over a wired or wireless transmission medium. The data packet is analyzed at step 404. This could include, for example, the router 200 identifying the protocol associated with the received data packet. The protocol could be identified in any suitable manner, such as by using the contents of the data packet or information about the device that sent the data packet. In some embodiments, the data packet is analyzed to determine if the packet is an ISA100-compatible packet or a WHART-compatible packet. In particular embodiments, data bytes in a header of the data packet may be used to identify the protocol. The data packet is sent to an appropriate protocol stack at step 406. This could include, for example, routing the data packet to an ISA100 protocol stack or a WHART protocol stack depending on the analysis results from step 404.

Note that this method 400 could occur for both data packets being routed for outgoing transmission ("down" protocol routing) and data packets being routed after incoming reception ("up" protocol routing). For down protocol routing, the type of data packet received could be based on the type of device that transmitted the message, and the data packet is routed to an appropriate protocol stack based on the determination. For up protocol routing, the type of data packet received could be based on the packet contents, and the data packet is again routed to an appropriate protocol stack based on the determination.

Although FIG. 4 illustrates one example of a method 400 for slot segregation for supporting multiple communication protocols, various changes may be made to FIG. 4. For example, the steps of FIG. 4 could occur any number of times for any number of data packets.

Figure 5:
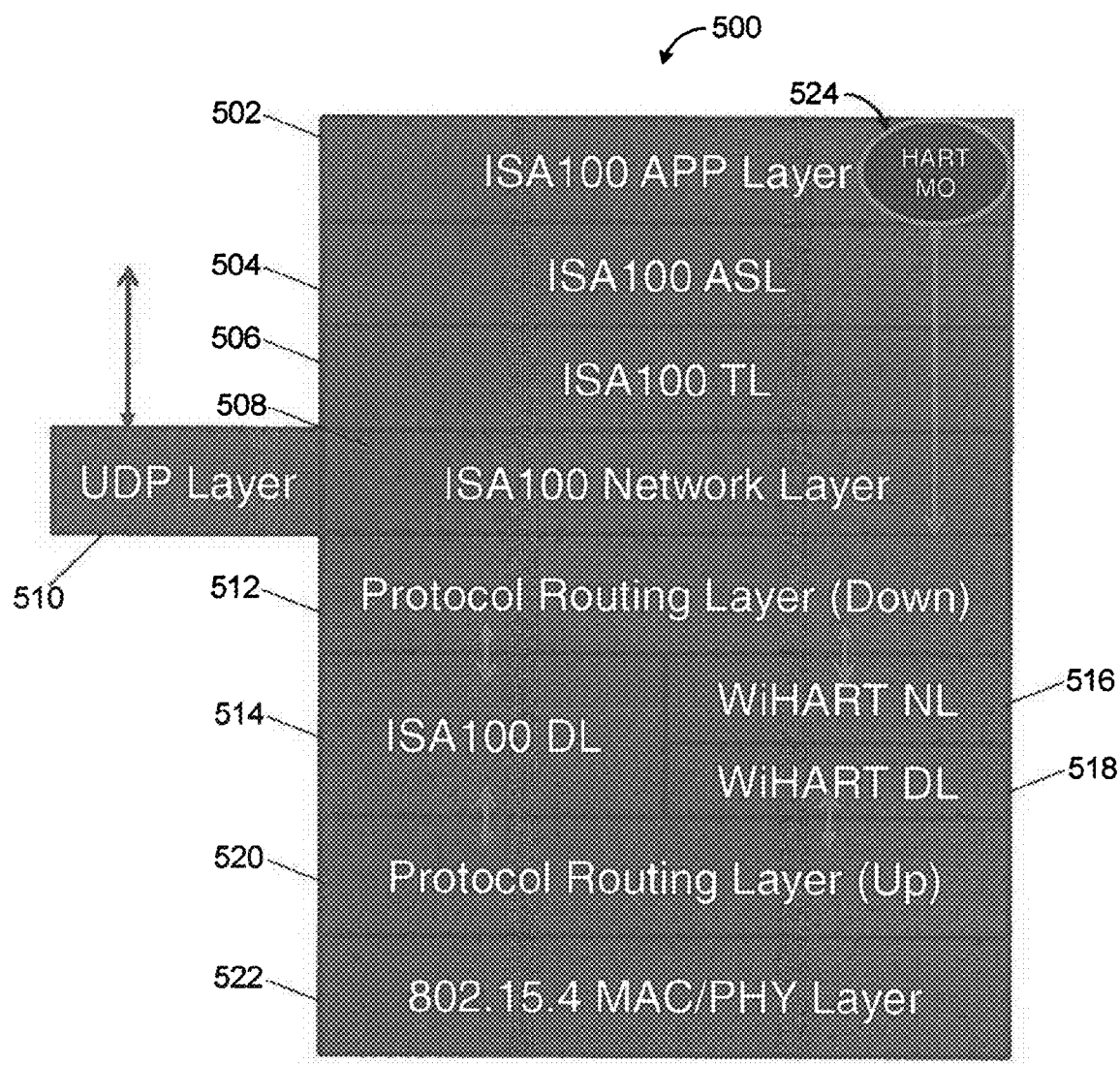
FIG. 5 illustrates an example layer implementation for supporting multiple communication protocols according to this disclosure.

FIG. 5 illustrates an example layer implementation for supporting multiple communication protocols according to this disclosure. In particular, FIG. 5 illustrates an overall protocol stack 500 that could be used in the routers 108a-108c, 110a-110b, 200 described above.

As shown in FIG. 5, the protocol stack 500 includes an ISA100 application layer (APP) 502, an ISA100 application sub-layer (ASL) 504, an ISA100 transport layer (TL) 506, and an ISA100 network layer 508. The transport layer 506 and the network layer 508 could support the standard OSI model functions for the ISA100 protocol. The application sub-layer 504 provides a level of abstraction by making it unnecessary for higher layers to know what types of services are available at the transport layer 506. The application layer 502 executes various applications that communicate with each other and with lower layers via the application sub-layer 504. A user datagram protocol (UDP) layer 510 supports communications with external devices, such as a gateway or backbone router.

Below the ISA100 network layer 508 is a protocol routing layer 512. The protocol routing layer 512 is responsible for performing the "down" protocol routing to direct outgoing data packets to either an ISA100 protocol stack or a WHART protocol stack for transmission. In some embodiments, the protocol routing layer 512 analyzes a data packet, determines whether a transmitting device is an ISA100 device or a WHART device, and routes the data packet stack based on the determination. For incoming data, the protocol routing layer 512 can route data packets to the ISA100 network layer 508.

The ISA100 protocol stack is implemented using an ISA100 data link (DL) layer 514, while the WHART protocol stack is implemented using a WHART network layer (NL) 516 and a WHART data link (DL) layer 518. These layers 514-518 can implement the standard OSI model functions for the ISA100 and WHART protocols.

A protocol routing layer 520 is responsible for performing the "up" protocol routing to direct incoming data packets to either the ISA100 protocol stack or the WHART protocol stack for further processing. In some embodiments, the protocol routing layer 520 analyzes contents of a data packet to determine whether the packet contains data from an ISA100 device or a WHART device. The protocol routing layer 520 then routes the data packet based on the determination. For outgoing data, the protocol routing layer 520 can route data packets to a medium access control (MAC)/physical (PHY) layer(s) 522.

The MAC/PHY layer(s) 522 support(s) communications over a wireless channel using the ISA100 and WHART protocols. The specific protocol used to transmit or receive a data packet can vary based on the time slot in which the device is currently operating. For example, as shown in FIG. 3, during time slots 310 in frames 302 and 306, the MAC/PHY layer(s) 522 can use the ISA100 protocol. During time slots 310 in frames 304 and 308, the MAC/PHY layer(s) 522 can use the WHART protocol.

In this particular example, WHART traffic can be routed to and from the backbone router or gateway via the ISA100 network layer 508. It may also be possible to route WHART traffic over the ISA100 network. A HART management object (MO) 524, which resides in the application layer 502, can be used to configure HART DL structures via the ISA100 network layer. Moreover, in particular embodiments, the protocol routing layer 520 can use templates and channels to transfer packets to the MAC/PHY layer(s) 522.

Although FIG. 5 illustrates one example of a layer implementation for supporting multiple communication protocols, various changes may be made to FIG. 5. For example, while the use of ISA100 and WHART are shown here, other or additional protocol stacks could be supported.

Figure 6:
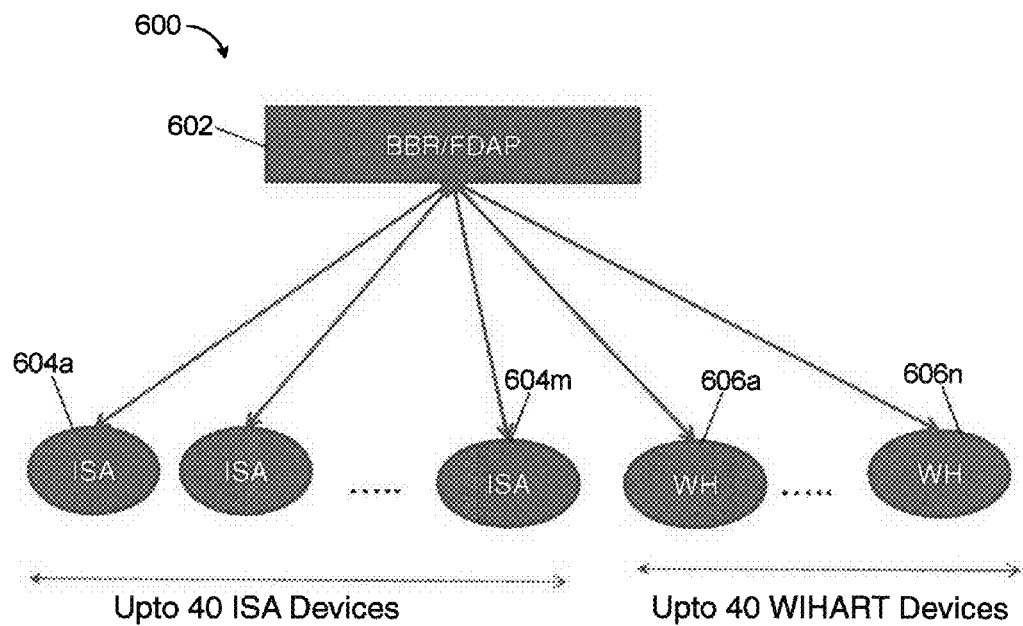
FIGS. 6 and 7 illustrate example architectures having slot segregation for supporting multiple communication protocols according to this disclosure.
Figure 7:
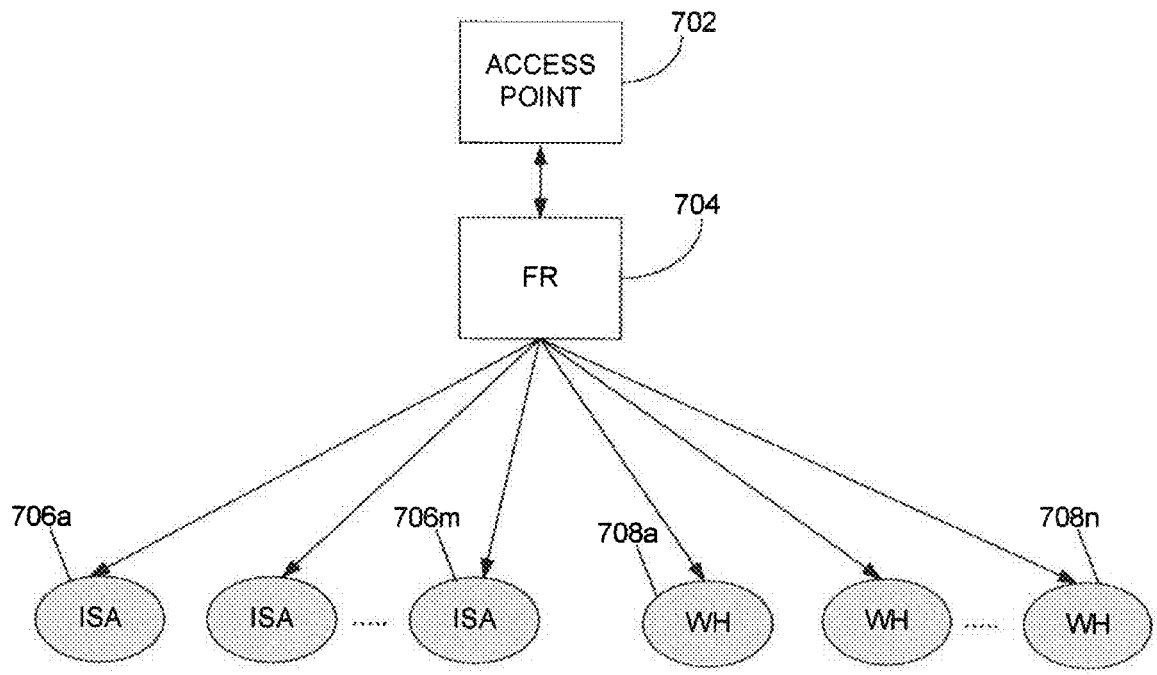

FIGS. 6 and 7 illustrate example architectures 600, 700 having slot segregation for supporting multiple communication protocols according to this disclosure. In FIG. 6, the architecture 600 includes a backbone router or field device access point 602, which can communicate with a number of ISA100 devices 604a-604m and a number of WHART devices 606a-606n. The devices 604a-604m and 606a-606n could represent field instruments or other routers. In this particular example, the router/access point 602 can communicate with up to forty ISA100 devices and forty WHART devices, although these values are for illustration only and the actual capacity of devices supported may vary.

In FIG. 7, an access point 702 can communicate with ISA devices 706a-706m and WHART devices 708a-708n indirectly via a field router (FR) 704. In this particular example, the access point 702 can communicate with up to forty ISA100 and WHART devices, although this value again is for illustration only.

Although FIGS. 6 and 7 illustrate examples of architectures 600, 700 having slot segregation for supporting multiple communication protocols, various changes may be made to FIGS. 6 and 7. For example, any other suitable architectures could be used.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    dividing a Time Division Multiple Access (TDMA) structure into a plurality of first time slots and a plurality of second time slots, the first and second time slots allocated to communications using first and second protocols associated with an industrial process control system, respectively;
    routing, by a protocol routing layer, each of a plurality of data packets to a first protocol stack associated with the first protocol or a second protocol stack associated with the second protocol;
    transmitting, by a physical layer, a first subset of the data packets to at least one first wireless device using the first protocol during the first time slots and not during the second time slots; and
    transmitting, by the physical layer, a second subset of the data packets to at least one second wireless device using the second protocol during the second time slots and not during the first time slots;
    wherein the TDMA structure comprises a superframe having multiple frames, each frame including multiple time slots, each frame containing only one of the first time slots or the second time slots.

2. The method of claim 1, wherein:
    the first protocol comprises an ISA100 protocol; and
    the second protocol comprises a Wireless Highway Addressable Remote Transducer (WHART) protocol.

3. The method of claim 1, further comprising:
    dynamically allocating the frames to the protocols based on a percentage of wireless devices that use the first protocol and a percentage of wireless devices that use the second protocol.

4. The method of claim 1, wherein the first and second time slots have different lengths; and
    at least one time slot in at least one of the frames is extended to encompass remaining time in the at least one frame.

5. The method of claim 1, further comprising:
    obtaining the plurality of data packets; and
    identifying, by the protocol routing layer, which protocol is associated with each data packet.

6. The method of claim 5, wherein identifying which protocol is associated with each data packet comprises using at least one of:
    a device type of a device generating the data packet; and
    contents of the data packet.

7. The method of claim 1, wherein the at least one first wireless device and the at least one second wireless device comprise at least one of: a field instrument and a router.

8. An apparatus comprising:
    a transceiver comprising a physical layer, the physical layer configured to communicate with wireless devices in different time slots of a Time Division Multiple Access (TDMA) structure, the TDMA structure including a plurality of first time slots and a plurality of second time slots, the first and second time slots to be respectively allocated to communications using first and second protocols associated with an industrial process control system; and
    a protocol routing layer configured to route each of a plurality of data packets to a first protocol stack associated with the first protocol or a second protocol stack associated with the second protocol;

wherein the physical layer is configured to transmit a first subset of the data packets to at least one first wireless device using the first protocol during the first time slots and not during the second time slots;

wherein the physical layer is configured to transmit a first subset of the data packets to at least one second wireless device using the second protocol during the second time slots and not during the first time slots; and wherein the TDMA structure comprises a superframe having multiple frames, each frame including multiple time slots, each frame containing only one of the first time slots or the second time slots.

9. The apparatus of claim 8, wherein:
the first protocol comprises an ISA100 protocol; and
the second protocol comprises a Wireless Highway Addressable Remote Transducer (WHART) protocol.

10. The apparatus of claim 8, wherein the transceiver is configured to dynamically allocate the frames to the protocols based on a percentage of the wireless devices that use the first protocol and a percentage of the wireless devices that use the second protocol.

11. The apparatus of claim 8, wherein the first and second time slots have different lengths; and
at least one time slot in at least one of the frames is extended to encompass remaining time in the at least one frame.

12. The apparatus of claim 8, wherein the protocol routing layer is further configured to:
obtain the plurality of data packets; and
identify which protocol is associated with each data packet.

13. The apparatus of claim 12, wherein the protocol routing layer is configured to identify which protocol is associated with each data packet using at least one of:
a device type of a device generating the data packet; and
contents of the data packet.

14. The apparatus of claim 8, wherein the physical layer is configured to communicate with at least one of: a field instrument and a router.

15. The apparatus of claim 8, wherein the frames containing the first time slots are interleaved with the frames containing the second time slots.

16. The apparatus of claim 8, wherein half of the frames include only the first time slots and half of the frames include only the second time slots.

17. A non-transitory computer readable medium embodying a computer program, the computer program comprising computer readable program code for:

dividing a Time Division Multiple Access (TDMA) structure into a plurality of first time slots and a plurality of second time slots, the first and second time slots allocated to communications using first and second protocols associated with an industrial process control system, respectively;

routing, by a protocol routing layer, each of a plurality of data packets to a first protocol stack associated with the first protocol or a second protocol stack associated with the second protocol;

transmitting, by a physical layer, a first subset of the data packets to at least one first wireless device using the first protocol during the first time slots and not during the second time slots; and transmitting, by the physical layer, a second subset of the data packets to at least one second wireless device using the second protocol during the second time slots and not during the first time slots;

wherein the TDMA structure comprises a superframe having multiple frames, each frame including multiple time slots, each frame containing only one of the first time slots or the second time slots.

18. The computer readable medium of claim 17, wherein:
the first protocol comprises an ISA1500 protocol; and
the second protocol comprises a Wireless Highway Addressable Remote Transducer (WHART) protocol.

19. The computer readable medium of claim 17, wherein the computer program further comprises computer readable program code for:
dynamically allocating the frames to the protocols based on a percentage of wireless devices that use the first protocol and a percentage of wireless devices that use the second protocol.

20. The computer readable medium of claim 17, wherein the first and second time slots have different lengths; and
at least one time slot in at least one of the frames is extended to encompass remaining time in the at least one frame.

21. The computer readable medium of claim 17, wherein the computer program further comprises computer readable program code for:
obtaining the plurality of data packets; and
identifying, by the protocol routing layer, which protocol is associated with each data packet.

22. The computer readable medium of claim 17, wherein the at least one first wireless device and the at least one second wireless device comprise at least one of: a field instrument and a router.

* * * * *